United States Patent [19]

Urlik

[11] Patent Number: 4,607,804
[45] Date of Patent: Aug. 26, 1986

[54] FILM WINDING AND REWINDING APPARATUS

[75] Inventor: Randall G. Urlik, Englewood, Colo.

[73] Assignee: Goldberg Brothers, Inc., Denver, Colo.

[21] Appl. No.: 701,932

[22] Filed: Feb. 15, 1985

Related U.S. Application Data

[63] Continuation-in-part of Ser. No. 666,187, Oct. 29, 1984.

[51] Int. Cl.$^4$ .......................... B65H 18/10; G03B 1/04
[52] U.S. Cl. .................................... 242/67.4; 242/205;
242/75.51; 242/57; 352/168
[58] Field of Search ................. 242/67.3 R, 67.4, 202,
242/204, 205, 200, 190, 57, 207, 75.51, 75.52;
352/168, 173; 360/90, 96.3, 96.4

[56] References Cited

U.S. PATENT DOCUMENTS

| | | | |
|---|---|---|---|
| 2,685,950 | 8/1954 | Demby | 242/57 |
| 2,782,677 | 2/1957 | Steigman | 242/57 X |
| 3,235,197 | 2/1966 | Johnson et al. | 242/67.4 |
| 3,494,573 | 2/1970 | Gerlach | 242/202 |
| 3,528,628 | 9/1970 | Wangerin | 242/67.4 X |
| 3,677,498 | 7/1972 | Johnson et al. | 352/168 X |
| 3,779,485 | 12/1973 | Wolf et al. | 242/67.4 X |
| 3,806,061 | 4/1974 | Kollar et al. | 242/202 |
| 3,809,336 | 5/1974 | Kollar et al. | 242/204 X |
| 3,858,828 | 1/1975 | Bundschuh et al. | 242/207 |
| 3,977,620 | 8/1976 | Devel | 242/67.4 |
| 4,347,993 | 9/1982 | Leonard | 242/75.51 |
| 4,436,251 | 3/1984 | Deyesso et al. | 242/75.51 X |

Primary Examiner—John M. Jillions
Attorney, Agent, or Firm—Edwin L. Spangler, Jr.

[57] ABSTRACT

This invention relates to an improvement upon the film winding and rewinding apparatus forming the subject matter of my copending application Ser. No. 666,187 filed Oct. 29, 1984, by a replacement of its former manually-shifted electrochemical reversing system for changing from a so-called "A-wind" to a "B-wind" with an electromagnetic one employing a pair of electromagnetic clutches on parallel counterrotating output shafts operatively linked together with a belt and pulley power transfer mechanism which cooperates with the clutches to impose a drag upon the supply reel regardless of which direction it is being turned by the power supplied to the take-up reel. The invention also encompasses an electromechanical circuit in which an idler spool responsive to the tension in the film passing between the supply and take-up reels actuates a potentiometer which, in turn, lessens the drag on the supply reel as the tension increases. The invention further encompasses a control circuit in which two or more different combinations of resistances can be switched to vary the drag on the supply reel to adjust for different reel sizes.

5 Claims, 5 Drawing Figures

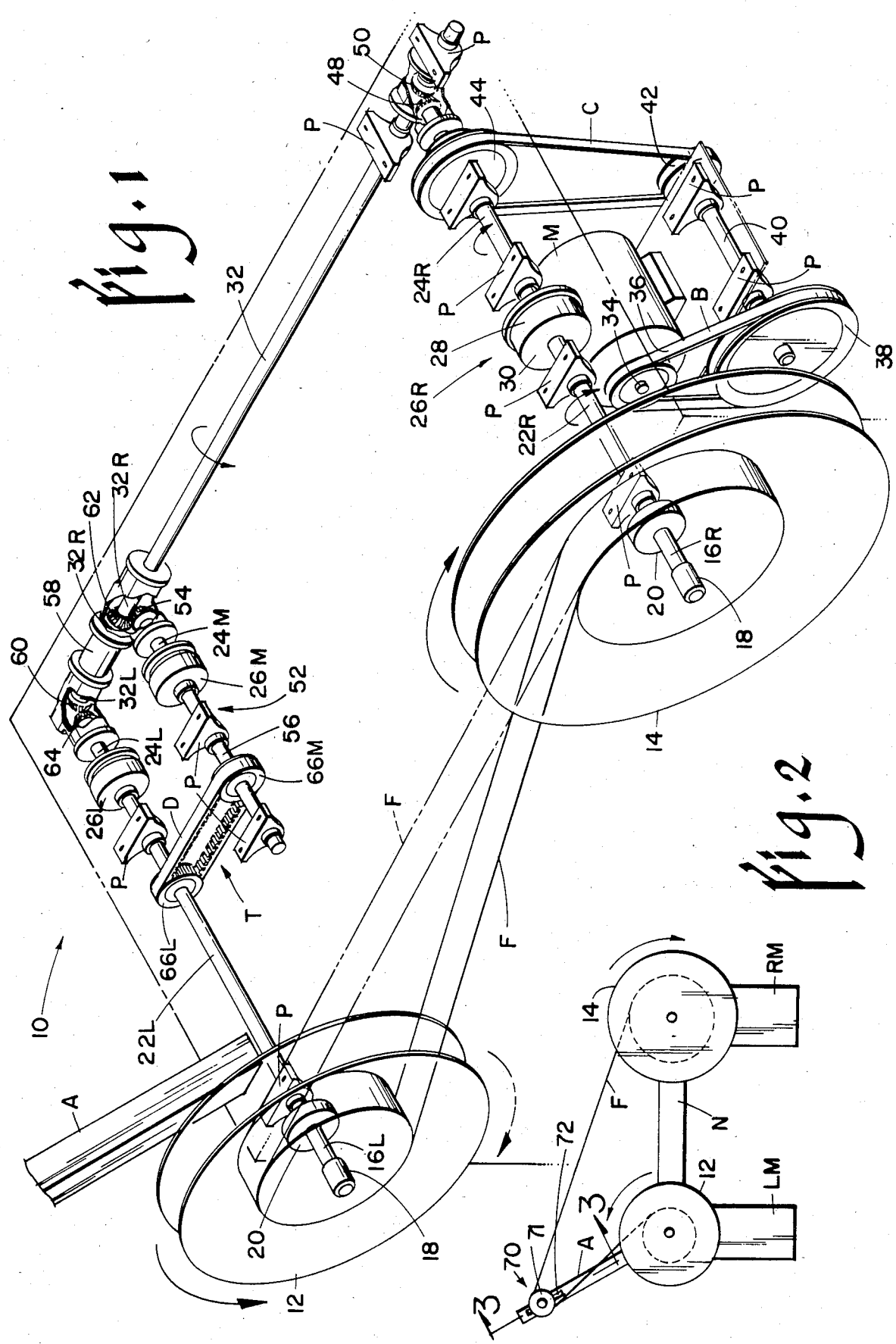

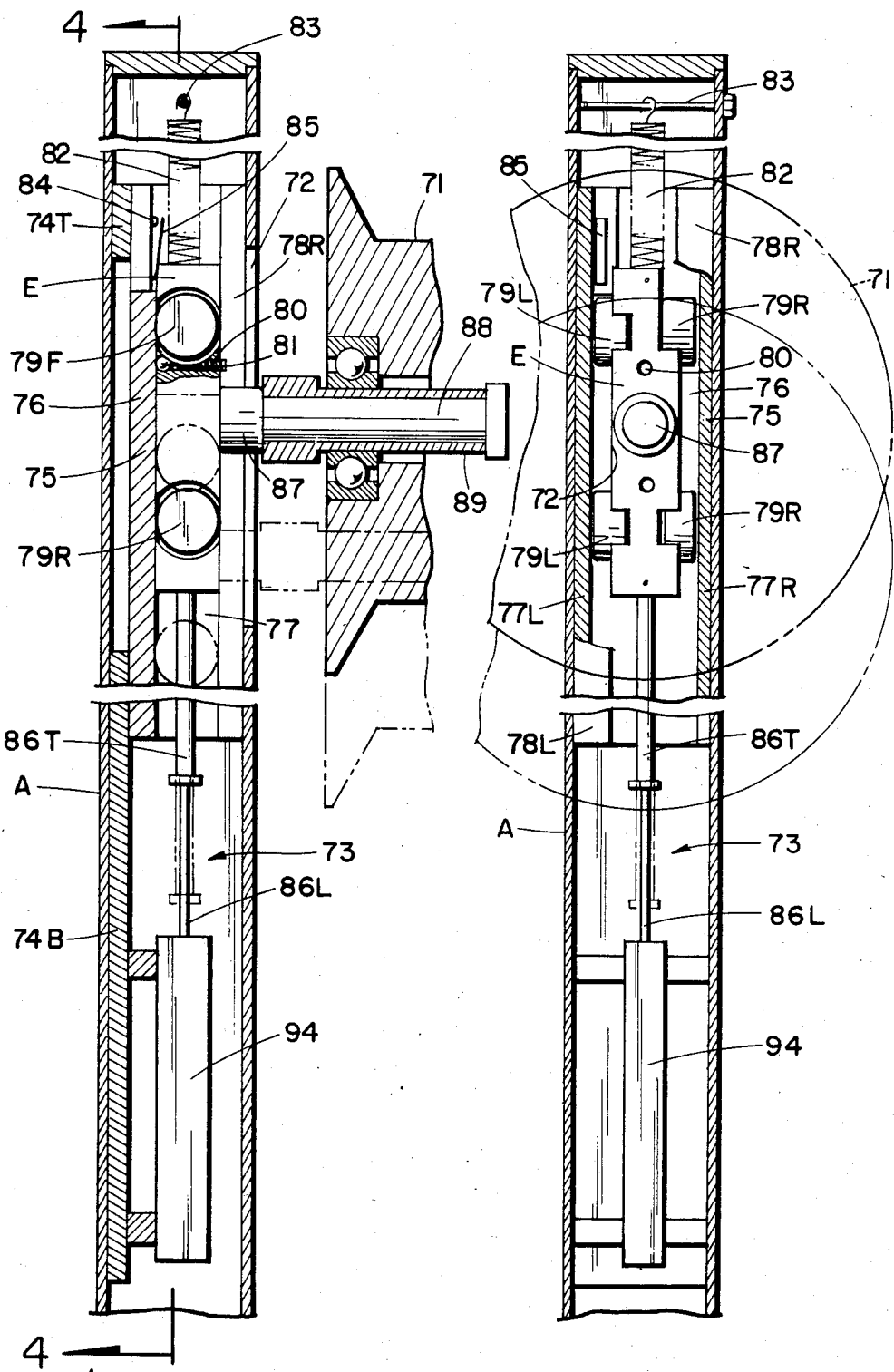

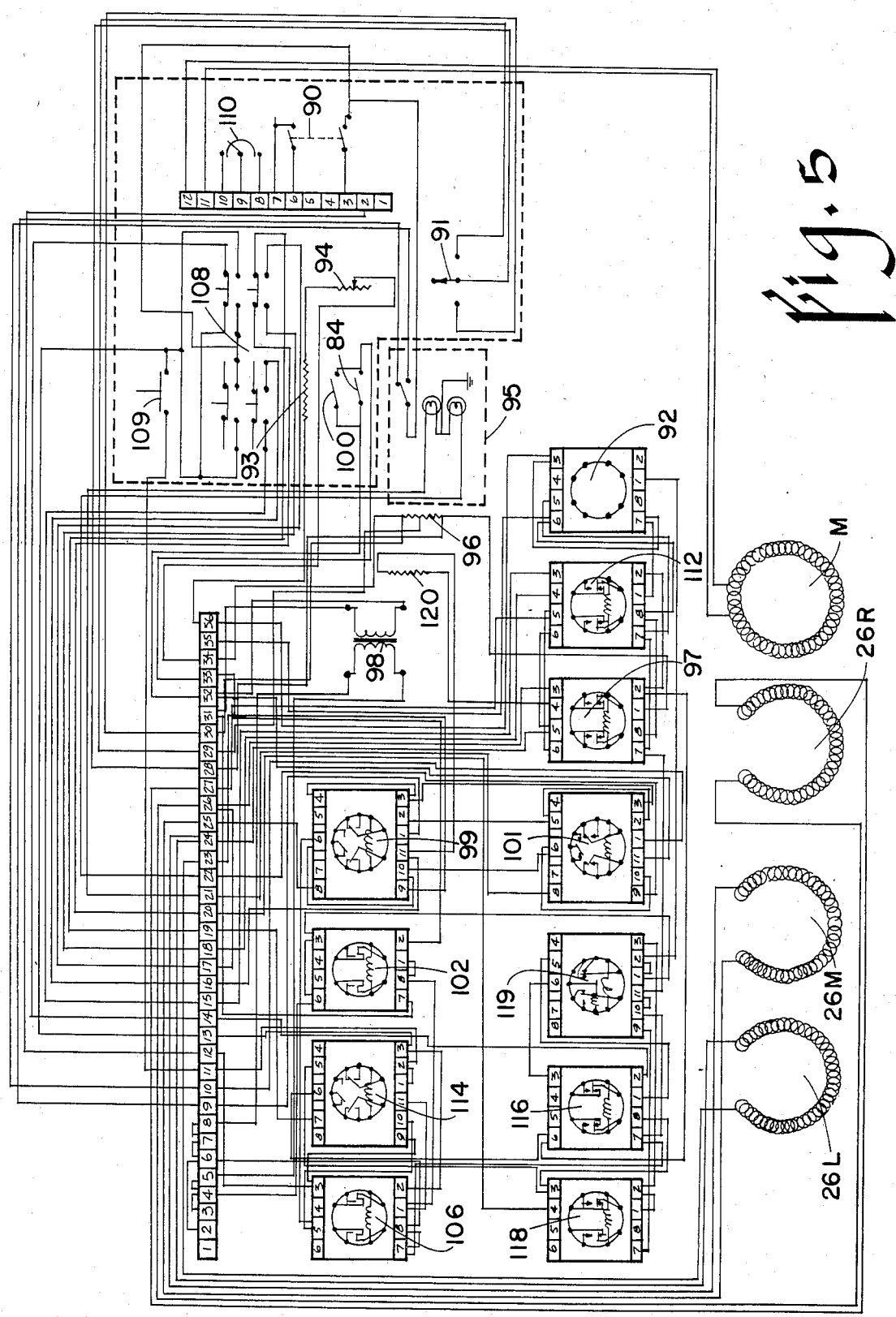

FILM WINDING AND REWINDING APPARATUS

This application is a continuation-in-part of my co-pending U.S. patent application Ser. No. 666,187 filed Oct. 29, 1984.

In this earlier application I disclosed a film winding and rewinding apparatus which incorporated as one of its main features the use of a single unidirectional electric motor in combination with a pair of conventional clutch/brake units and a mechanical drive train to drive the take-up reel in one direction while, at the same time, inhibiting the rotation of the supply reel thereby tensioning the film passing therebetween regardless of which direction the supply reel was being forced to turn as a function of the particular type of wind, i.e. the so-called "A-wind" in which the film passes from the underside of the hub of the supply reel onto the top of the hub of the take-up reel thus causing the two to counterrotate or the "B-wind" in which both reels turn the same direction and the film passes from the top of the hub of the supply reel onto the top of the hub of the take-up reel. The shift from the A-wind mode to the B-wind mode required the operator to manually actuate a simple bevel gear transmission in order to reverse the direction of the shaft supplying the drag to the supply reel. While this worked quite satisfactorily, I have now discovered an electromechanical method for accomplishing this changeover or shift from the A-wind to the B-wind or vice versa that does away with the manual actuation of the mechanical transmission and substitutes therefor a control circuit which selectively disengages one clutch/brake unit connected to the supply reel shaft while engaging the other so as to attempt to counterrotate it in a direction opposite to that in which the supply reel is being turned thus imposing a drag upon the latter and tensioning the film passing onto the take-up reel.

In my earlier unit, I had incorporated the capability of rewinding in either the A-wind mode or the B-wind mode by merely reversing the roles of the two clutch/brake units. More specifically, if the clutch/brake unit on the righthand side of the unit was actuated into its so-called "brake mode" it became operative to override the clutch/brake unit on the lefthand side of the unit and make the righthand reel the take-up reel. With the clutch/brake unit on the lefthand side in its "clutch mode" its action became one of attempting to rotate the shaft to which the supply reel was connected in a direction opposite to that in which it was being turned as the film was pulled off the latter onto the take-up reel. When rewinding the film, it was only necessary to reverse the functions of the two clutch/brake units because, when this was done, the lefthand one switched into its brake mode and would turn the lefthand reel in a direction opposite to that in which it turned when functioning as the supply reel thereby pulling film off of the righthand reel and causing the latter to turn in a direction opposite to that in which it turned as the take-up reel. Meanwhile, the righthand clutch/brake unit in its clutch mode would be overridden by the lefthand one and operate in a manner to try and turn the righthand reel shaft in a direction opposite to that in which the reel associated therewith was being turned to, once again, tension the film. This important function of being able to shift the roles of the reels and thus use the system to both wind and rewind the film without having to change reels has been preserved intact although accomplished somewhat differently.

I now accomplish the shift between A-wind and B-wind by driving a counterrotating shaft on the left side of the unit alongside and in parallel relation to the one I had before which was reversible but is now unidirectional. These counterrotating shafts do away with the necessity of having a manually-actuated transmission to reverse the direction of a single shaft; however, I had to add a third clutch/brake unit along with a power transfer mechanism to operatively interconnect these two shafts, only one of which is connected to the reel on the lefthand side.

In my other unit I also required the operator to adjust periodically the drag on the clutch/brake unit in the clutch mode so as to accommodate the variation in film tension as the film wound off the supply reel and onto the take-up reel. As the film passed from one reel to the other, I passed it over an idler spool spring-biased toward a microswitch that became operative upon being actuated to shut off the power to the take-up reel. Thus, as the film end left the supply reel and released the idler spool, the system automatically shut down.

I have retained this valuable feature but, in addition, I have enhanced its capabilities by using the excursions of the idler spool brought about by variations in the film tension to actuate a potentiometer contained within a control circuit which, in turn, adjusts the drag imposed upon the take-up reel by changing the voltage supplied to the clutch/brake unit actuated into its clutch mode thereby automatically maintaining the tension on the film at a near constant level.

Since the drag necessary to maintain proper film tension varies with the diameter of the reels as well as with the constantly changing diameter of the film wound thereon, I found my earlier unit lacking in the capability of compensating for different film reel sizes. I have now overcome this shortcoming by switching in different combinations of resistances to adjust the drag on the clutch/brake unit operating in the clutch mode as the diameter of the film reels is changed.

It is, therefore, the principal object of the present invention to provide a novel and improved film winding and rewinding apparatus.

A second objective is the provision of a device of the type aforementioned wherein the wind may be shifted between the A-wind mode and the B-wind mode electrically thus eliminating the need for actuating a mechanical transmission manually.

Another object of the invention herein disclosed and claimed is that of utilizing an idler spool interposed between the supply and take-up reels which is responsive to the film tension therebetween to change the drag on the supply reel thus maintaining such tension at a near constant level.

Still another objective is to provide a motorized film winding machine that can be compensated for different diameter film reels by switching in different combinations of resistances effective to change the drag on the supply reel.

An additional object is to provide a film winder that can be used to rewind film as well as wind same in both the A-wind and the B-wind modes without having to change reels.

Further objects are to provide a film winding and rewinding apparatus that is simple to operate, versatile, rugged, dependable, compact, easy on the film and even somewhat decorative.

Other objects will be in part apparent and in part pointed out specifically hereinafter in connection with the description of the drawings that follows, and in which:

FIG. 1 is a schematic view in perspective showing how the drive train connecting the motor to the take-up and supply reels cooperates with the two clutch/brake units operatively associated with the latter to impose a drag thereon in both the A-wind and the B-wind modes;

FIG. 2 is a front elevation showing the path of the film from the supply to the take-up reel as it is threaded over the automatic shut-off mechanism;

FIG. 3 is a fragmentary longitudinal section to a greatly enlarged scale taken along line 3—3 of FIG. 2;

FIG. 4 is a fragmentary longitudinal section to the same scale as FIG. 3 taken along line 4—4 of the latter; and, FIG. 5 is a circuit diagram illustrating the electronic circuit diagram used for controlling operation of the apparatus.

Referring next to the drawings for a detailed description of the present invention and, initially, to FIG. 1 for this purpose, it can be seen that as was the case in my earlier application, reference numeral 10 has, once again, been selected to broadly designate the reel drive mechanism in its entirety while numerals 12 and 14 refer to the film reels, one of which is driven thereby. One of these two reels functions as the supply reel while the other is the take-up reel; however, either reel may function as the supply reel on one occasion and the take-up reel on another. Reel drive spindles 16R and 16L are journalled for rotation in spaced substantially parallel relation as shown and each such spindle detachably connects to the reel hub in the center of the reel for conjoint rotation. A reel retainer 18 holds the reel on the spindle and a shaft coupling 20 on each of the spindles connects them to their respective output shafts 22L and 22R, respectively, for conjoint coaxial rotation. Input shafts 24L and 24R are coaxially aligned with output shafts 22L and 22R, respectively, but are journalled for rotation independently thereof in pillow blocks P.

An operative connection between aligned shafts 22 and 24 is established frictionally by a pair of commercialy-available clutch/brake units that have been broadly designated by reference numerals 26L and 26R. Each of these units includes an axially-movable armature 28 which is sometimes spring loaded into a retracted inoperative position and an electromagnet 30 faced with a friction plate. As voltage is supplied to the electromagnet, it responds by attracting the armature overcoming the spring bias on the latter to either lock the two together for conjoint rotation or, alternatively, to permit frictionally-inhibited slippage to take place therebetween depending upon the voltage supplied to the magnet. Functionally, each of these units has two actuated conditions, the first being what will be referred to here as the "brake mode" wherein the armature 28 is electromagnetically attracted to the friction disk carried by the magnet 30 such that input shafts 24 are connected to their output shafts 22 for conjoint rotation. The second actuated position is also an operative one in which the electromagnetic attractive forces between the magnet and armature are present but of insufficient magnitude to lock these elements and the shafts joined thereto together for conjoint rotation provided a load is applied to one of the two engaged elements to overcome the frictional contact therebetween. In this second so-called "clutch mode", the magnetic attractive forces between the armature and magnet can be varied by means of a potentiometer P which will be described in detail presently such that the input shafts 24 exert a retardant action on the driven shafts 22 which inhibit their being driven in the reverse direction. It is this clutch mode which is employed to tension the film F as it passes from one reel to the other, this being an operation that will also be described in more detail later on.

A transverse shaft 32 operatively interconnects the right and left input shafts 22R and 24L for synchronous rotation. Electric motor M is mounted such that its motor shaft 34 lies in spaced parallel relation to the axially-aligned output and input shaft combinations previously described. A pulley 36 on the motor shaft is connected by means of a V-belt B to a second pulley 38 on the front end of intermediate shaft 40. Pulley 42 on the other or rear end of this intermediate shaft is, in turn, operatively connected to pulley 44 on the rear end of the righthand input shaft 24R by means of V-belt C. Thus, from an operator's position facing the reels, if we assume that the motor shaft is turning clockwise, intermediate shaft 40 along with input shaft 24R will be doing likewise.

A pair of meshed bevel gears 48 and 50 on adjacent ends of the righthand input shaft and the transverse shaft 32 cooperate to turn the latter in the opposite direction, i.e. counterclockwise as viewed from the righthand end of the drive assembly. On the opposite or lefthand end of shaft 32 is the improved reversing subassembly forming the subject matter of the instant application and which has been broadly designated in the drawings by reference numeral 52. It, however, has a number of elements in common with the reversing subassembly of my earlier application. For instance, input shaft 24L on the left side of the unit is connected to transverse shaft 32 for clockwise rotation by means of bevel gears 60 and 64 shown contained within a suitable housing. Clutch/brake unit 26L still operatively interconnects the input shaft 24L with the output shaft 22L; however, bevel gears 60 and 62 are no longer mounted upon a sleeve for axial movement along transverse shaft 32 where they can be selectively engaged with bevel gear 64 to turn the input shaft 24L in opposite directions so as to accomplish the changeover from the A-wind mode to the B-wind mode and vice versa. Instead, bevel gear 62 is mounted directly on shaft 32 as is bevel gear 60 but spaced therefrom so as to mesh with still another bevel gear 54 mounted on a third input shaft 24M journalled for rotation in fixed spaced parallel relation to shaft 24L. Gears 62 and 54 are contained within a suitable housing as shown and they cooperate to turn what will be referred to as "third input shaft 24M" in the opposite direction to input shaft 24L or counterclockwise as viewed from the vantage point of the operator. This third input shaft, like its counterparts 24R and 24L, is operatively connected to a shaft 56 axially aligned therewith by means of a third clutch/brake unit 26M. Shafts 24M and 56 are, of course, journalled for rotation in pillow blocks P as is the case with the other shafts in the reel drive assembly. In the particular form illustrated the transverse shaft is shown in two parts, 32R and 32L interconnected between gears 60 and 62 by means of a conventional shaft coupling 58.

A power transfer subassembly indicated in a general way by the letter T defines a driving connection between shafts 56 and 22L effective to turn them the same direction at the same speed. Included within this power transfer subassembly are a pair of pulleys 66M and 66L interconnected by a belt D. The reversing subassembly 52 is responsible for turning the output shaft 22L either clockwise or counterclockwise depending upon whether the system is to be operated in the A-wind mode or the B-wind mode.

FIG. 1 illustrates the A-wind mode in which the film F winds off the bottom of the hub of the supply reel 12 on the left and onto the top of the hub of the take-up reel 14 on the right. It should, perhaps, be mentioned that in both the "wind" modes, whether it be A-wind or B-wind, the reel on the left is the supply reel and the reel on the right is the take-up reel. It is only in the rewind mode that the roles of the reel is reversed. With reel 14 functioning as the take-up reel, clutch/brake unit 26R on the righthand side is actuated into its brake mode where input shaft 24R and output shaft 22R turn as a unit. Thus, the motor shaft 34 along with all the aligned shafts 24R, 22R and 16R will all be turning clockwise as will be the lefthand input shaft 24L. Clutch/brake unit 26M will be completely deenergized while unit 26L will be actuated in its clutch mode. Input shaft 24M will be turning counterclockwise but, with clutch/brake unit 26M deenergized, it will be disconnected from shaft 56 which will be turning in the same direction and at the same speed as output shaft 22L by reason of the power transfer assembly T interconnecting the two.

With clutch/brake unit 26L actuated into its clutch mode, it will be attempting to turn output shaft 22L in the same clockwise direction as input shaft 24L; however, the film F is being pulled off the bottom of reel 12 as shown causing it to turn in the direction of the arrow or counterclockwise. Since clutch/brake unit 26R in the brake mode overrides the clutch/brake unit 26L in the clutch mode, the net result is that the supply reel turns counterclockwise as shown while the latter clutch/brake unit exerts a retardant action tensioning the film as it attempts to hold back reel 12. Up to this point the action of the system in the A-wind mode is no different than it was in my previous unit where I shifted bevel gears 60 and 62 into selective engagement with gear 64. Now, however, the B-wind mode shown in phantom lines in FIG. 1 is quite different.

In the B-wind mode, both the supply reel 12 and the take-up reel 14 will be turning clockwise as indicated by the broken arrow at reel 12. Input shaft 24L will be turning clockwise as before, however, clutch/brake unit 26L will be deenergized thus disconnecting shaft 24L from output shaft 22L. The latter shaft will now be controlled by shaft 56 to which it is connected by means of the power transfer subassembly T. Shaft 56, in turn, is operatively linked to input shaft 24M by means of the third clutch/brake unit 26M which has been shifted from its former deenergized condition into its clutch mode. As such, it is attempting to turn both shafts 56 and 22L counterclockwise in the direction of the full-line arrows; however, with the film F being pulled off the top of the supply reel 12, it will be turning clockwise and the shafts 22L and 56 will be doing likewise as indicated by the broken-line arrows. Once again, the clutch/brake unit 26R in the brake mode will be overriding the one 26M actuated into its clutch mode. The latter clutch/brake unit 26M will, however, be exerting a retardant action on the supply reel 12 in the B-wind mode just the same as clutch/brake unit 26L did in the A-wind mode.

In the rewind mode, reel 14 becomes the supply reel and reel 12 the take-up reel. If, for example, the film was wound from the supply reel 12 onto the take-up reel 14 in accordance with the A-wind mode shown in full lines in FIG. 1, then it must be rewound in the same way, i.e. from the top of the supply reel 14 onto the bottom of the take-up reel 12. To do so, clutch/brake unit 26R is shifted into its clutch mode, unit 26M is deenergized and unit 26L is switched into the brake mode. By so doing, the righthand clutch/brake unit 26R will be attempting to turn reel 14 clockwise while the overriding action of unit 26L will turn it counterclockwise at the same time it is turning the take-up reel 12 clockwise. Clutch/brake unit 26R is now exerting the retardant action upon the supply reel 14. With shafts 24L and 22L both turning clockwise, shaft 56 will, of course, be doing likewise due to the operative interconnection therebetween by reason of power transfer subassembly T. Even though shaft 24M is turning counterclockwise and shaft 56 clockwise, they are free to do so since clutch/brake unit 26M is deenergized.

Now, if the film has been wound onto the take-up reel 14 in the B-wind mode, obviously it must be rewound the same way. In such a situation, the clutch/brake unit 26R remains actuated in the clutch mode and the only difference is that clutch/brake unit 26L is deenergized and unit 26M is actuated into its brake mode. Supply reel 14 continues as before to turn counterclockwise as the film is being unwound therefrom while clutch/brake unit 26R exerts the retardant action thereon. The take-up reel 12 will, however, in this instance, be turning counterclockwise like the supply reel and, therefore, the driving connection is from shaft 24M through clutch/brake unit 26M to shaft 56, then from the power transfer subassembly T to output shaft 22L, all of which are turning counterclockwise. Input shaft 24L will still be turning clockwise but be disengaged from the reel-driving shafts due to being decoupled therefrom at clutch/brake unit 26L.

With brief reference to FIG. 2, a table N is shown having right and left pedestals RM and LM, respectively. This table mounts the apparatus shown in FIG. 1 which has already been described in considerable detail along with the electrical control circuit and idler arm A which houses a somewhat improved version of the automatic shut-off subassembly 70 of my unit along with an automatic film tensioning subassembly that has been shown in detail in FIGS. 3 and 4 to which reference will be made presently. Reels 12 and 14 are shown mounted on their respective mounting spindles 16L and 16R with the film being wound in the A-wind mode off the supply reel 12 and onto the take-up reel 14 after being passed over the idler spool 71 which moves, as before, up and down along the slot 72 in arm A as the tension on the film varies.

FIGS. 3 and 4 show the details of both the automatic shut-off assembly as well as the automatic film-tensioning subassembly that has been indicated in a general way by reference numeral 73 and which forms a part of the latter. Arm A is a hollow metal box beam containing slot 72 adjacent its upper end. Housed inside the box beam mounted on support members 74T and 74B is a rail-forming element 75 having a rear web 76 bordered both top and bottom by forwardly extending parallel right and left flanges 77R and 77L. Each of these flanges has an inturned lip 78 along its front edge as seen in FIG. 3. Lipped flanges 77 cooperate with one another and with the rear web 76 of the rail-forming member to define opposed upper and lower tracks for the reception of wheeled miniature dolly E. Right and left pairs of rollers 79R and 79L are mounted for rotation on suitable transversely-extending shafts (not shown) and ride within the tracks previously described. Dolly E, therefore, is free to roll up and down the rail-forming member in much the same manner as the slideblock of my previous unit but somewhat more easily. In FIG. 3, I have also shown a threaded plug 80 threadedly mounted from front to rear in the dolly with a ball 81 on its rear end. This plug and ball can be used if necessary to inhibit movement of the dolly along the rail-forming member in case the movement of the film over spool 71 causes it to begin moving erratically, i.e. bouncing.

A tension spring 82 connected to pin 83 in the upper end of the box beam and to the front end of the dolly normally biases the latter into engagement with switch actuator 85 of microswitch 84. Spool 71 is released into its extended position in which it engages this microswitch when the film end leaves the supply reel 12. As was the case in my previous unit, microswitch 84 is normally closed, however, upon actuation into the open position, it shuts off power to the motor M which, when thus deenergized, quickly brings the take-up reel 14 to a stop.

The slot 72 (FIG. 4) defined between the inturned flanges 78L and 78R of the rail-forming member forms a third track in which roller 87 on stubshaft 88 rolls. Sleeve 89 slips over shaft 88 and is retained in place by a threaded plug. The spool is, in turn, journalled for rotation on the latter sleeve as shown in FIG. 3. The spool shown is for 70 mm film, however, other spools, including stepped ones to handle both 16 mm and 35 mm film can be interchanged with the one shown provided spacers (not shown) are used on both the front and rear to keep the spool in proper alignment with the reels.

The novel aspects of the automatic shut-off system just described have, for the most part, to do with the automatic film tensioning feature which forms an integral part thereof. Housed within the box beam below and to the right of the dolly is a linear potentiometer 94 of conventional design. Its movable contact moves with reciprocating rod 86L that is connected to the trailing stem 86T of the dolly E. As the spool 71 moves down from its full line position shown in FIGS. 3 and 4 into its phantom line position in response to greater tension in the film passing thereover, potentiometer 94 increases the resistance in the circuit actuating the clutch/brake unit into the clutch mode that is exerting the retardant action on the supply reel thereby lowering the voltage supplied thereto and lessening the braking action automatically to restore the film tension to a preselected level. Conversely, should the film tension lessen and the spool begin to climb up the arm A toward the microswitch, the resistance will be reduced thereby increasing the voltage supplied to the clutch/brake unit in the clutch mode so as to increase the braking action of the latter and, once again, restore the film tension to its preset level.

Referring to FIG. 5 for a detailed description of the control circuit, the operation of the unit will first be described in the FORWARD mode, A-wind. Switch 90 is the main power switch which is a double-pole single-throw one operative in closed position to energize fixed power supply 92. The output of fixed power supply 92 is applied to normally-closed contacts of brake selector relay 112. It is also applied simultaneously to current limiting resistor 93 which is wired in series with mechanically driven linear motion potentiometer 94 whose output is a variable power supply. This output is coupled in series through voltage divider network 96 and applied to normally-closed contacts of clutch selector relay 97 which actuates clutch/brake unit 26L or 26M, depending on the position of A/B-wind switch 95, into the clutch mode. A current limiting resistor 120 is connected between the output of clutch selector relay 97 and the input of clutch/brake unit 26L or clutch/brake unit 26M depending, of course, upon the states of A/B-wind latching relays 99 and 101, thus compensating electrically for the additional mechanical drag of two gear boxes and two clutches connected to reel spindle 16L as compared to the lighter mechanical drag of one gear box and one clutch connected to reel spindle 16R.

Three-position shunt switch 91 either allows a large amount, a medium amount, or no amount of voltage to be absorbed by voltage divider network 96, which adjusts the range of voltages coming from linear motion potentiometer 94 to the preselected clutch, thus compensating for small, medium, and large reels, respectively. Linear motion potentiometer 94 is mechanically coupled by linkage L1 and L2 to film idler spool 71 and is driven through its full travel by extreme variations in film tension. Transformer 98 is also energized upon actuation of the main power switch to closed position. Microswitch 84 will be open due to the fact that the film is not tensioning the spool 71 and dolly E into retracted position; however, if switch 100 is actuated to closed position shunting microswitch 84, transformer 98 will activate the control power to relay 102. Relay 102 when thus activated will complete a circuit up to time delay relay 106 which relay, however, is without control power at this point, therefore, there is no power input to motor control 104. Power is available at mode or direction control switch 108 which is seen to be a three-position four-pole double-throw switch. It has an OFF position in which it is open and two closed positions, one being FORWARD and the second, REVERSE.

To begin operation, mode switch 108 is actuated from OFF into its FORWARD position which puts control voltage to time delay relay 106 and it commences its time delay period of several seconds at the expiration of which it closes and completes the input power to motor control 104. At this same time, power is supplied to one side of momentary start switch 109, the function and operation of which will be described in detail presently. The output of motor control 104 when thus activated will turn on motor M provided speed adjustment control 110 is on other than zero. When 110 is set on other than zero, the system should be protected against a full power or near full power start-up of motor M. This is accomplished by building in a five-second "ramp time" motor circuit thus allowing motor M to come up to speed slowly. Actuation of mode switch 108 into the FORWARD mode immediately energizes the right-hand clutch/brake unit 26R into the brake mode by allowing current flow from the output of fixed power supply 92 through the normally-closed contacts of relay 112. Righthand reel 14 is now being driven clockwise and is functioning as the take-up reel while reel 12 on the left side is the supply reel. With A/B-wind switch 95 in the A-wind position, clutch/brake unit 26L on the left side is actuated into the clutch mode and depending upon the position of potentiometer 94, it will be exerting a frictional drag on this reel thus tensioning the film. The left input shaft 24L will be turning clockwise while output shaft 22L will be forced to turn counterclockwise due to the film being pulled off supply reel 12.

As soon as the film is tensioned, it can be threaded over spool 71 which will pull the dolly E down against the bias of spring 82 thereby releasing switch 84 to its normally-closed position. As thus actuated, manual switch 100 can be reopened to activate the automatic shut-off subassembly 70 which subassembly, by the way, is fully operative in both the FORWARD and REVERSE modes. As the film end leaves supply reel 12, it will release the shut-off subassembly 70 in the manner previously described to reopen switch 84. When this switch reopens, control power is cut off to relay 102 thus opening the input circuit to motor 104 and shutting off the motor M.

An alternative start-up mode which avoids the time delay through time delay relay 106 utilizes relay 114. One side of the power circuit required to energize quick-start relay 114 is supplied through the normally-closed contacts of relay 106. Closure of quick-start switch 109 completes the circuit to quick-start relay 114 thus shunting that portion of time delay relay 106 which normally impresses a time delay on the operation of motor control 104.

Momentry actuation of switch 109 also actuates another section of quick-start relay 114 so as to shunt the normally-open contacts of 109 thereby enabling it to be released to open position and keep the motor control circuit energized. Even though a section of time delay relay 106 has been shunted, it is still timing and when it times out, the normally-closed contacts of this same relay open and deenergize the quick-start relay 114.

In going from FORWARD to OFF in either wind mode while film remains on the supply reel, mode control switch 108 is actuated such that control power to time delay relay 106 is interrupted and it, in turn, instantly opens the input power circuit to motor control 104 thus stopping the motor. Another section of switch 108 will simultaneously open and deenergize clutch/brake unit 26R thus permitting output shaft 22R, spindle 16R and the take-up reel 14 to free-wheel while a drag remains on the supply reel due to the fact that the lefthand clutch/brake unit 26L remains energized in the clutch mode. This permits both reels to coast to a gradual stop without spilling film which would occur if the take-up reel were stopped instantly while the supply reel continued to turn. If, on the other hand, the supply were to be stopped while the take-up reel continued to turn, the film would either break or become scratched as the winds rub against one another.

If one were to start-up in reverse, the righthand reel 14 becomes the supply reel and the lefthand one the take-up reel. With mode selection switch 108 actuated into its REVERSE position, a control voltage is supplied to double-pole double-throw relay 116. Part of this relay functions as an external control switch which, when it closes, causes time delay "off" relay 119 to immediately close its normally-open contacts applying control voltage to time delay "on" relay 118. When the normally-open contacts of relay 118 close, control power is thus made available simultaneously to relays 97 and 112. When relays 97 and 112 are actuated, they function to switch the power supplies to the clutch/brake units, specifically, connecting a variable voltage to the righthand clutch/brake unit 26R and the fixed power supply 92 to the lefthand clutch/brake unit 26L thus energizing the latter into its brake mode.

Another section of switch 108 will simultaneously supply control voltage to time delay 106. As relay 106 times out, it will activate and complete the input power circuit to motor control 104 thereby starting the motor in the same direction it turned during the FORWARD mode. As it does so in the A-wind mode, lefthand reel 12 functioning as the take-up reel is being turned clockwise by the clutch/brake unit 26L in its brake mode. Input shaft 24R on the right side will also be turning clockwise; however, its output shaft 22R along with the righthand spindle will be turning counterclockwise as film is being pulled off of it. As shafts 24R and 22R counterrotate, clutch/brake unit 26R in the clutch mode tensions the film to a variable degree depending upon the setting of potentiometer 94.

It should, perhaps, be pointed out that the time delay periods of time delays 118 and 119 must be equal to or shorter than the time delay period of time delay relay 106. The reason for the foregoing is that the clutch/brake units must be energized and operative before the motor is being brought up to speed.

In order to quick-start in REVERSE, quick-start switch 109 is momentarily closed as before and, in addition to its shunting the normally-open contacts of time delay relay 106, it also shunts the normally-open contacts of time delay relay 118 through the fourth section of mode switch 108 and also through another section of relay 114. If the aforementioned normally-open section of mode switch 108 were not present, relays 97 and 113 would be activated at any time the quick-start switch was actuated in both the FORWARD and REVERSE modes, therefore, one could not accomplish a forward wind.

The time delays become primarily useful when shifting directly from FORWARD to REVERSE or vice versa because, obviously, the system must have time to come to a stop before changing direction. Also, as was the case in shifting from the FORWARD mode into the OFF position, clutch/brake unit 26L must be instantly deenergized to allow the lefthand reel 12 to free-wheel. This is done in the REVERSE mode somewhat differently. Specifically, when going from REVERSE to either OFF or FORWARD, a section of mode switch 108 interrupts the input to clutch/brake unit 26L allowing the lefthand reel to free-wheel while clutch/brake unit 26R on the right side remains energized to apply holdback tension to the supply reel 14 until relays 97 and 112 are deactivated as time relay 119 times out to its normally-open state, whereupon, if the mode switch 108 is in its OFF position, everything will coast to a stop without overrunning and spilling film. Alternatively, if the mode switch 108 is shifted directly from REVERSE to FORWARD, time delay relay 119 begins to time out and relay 106 times in. During these time periods, the system slowly comes to a complete stop, the power supply 92 and potentiometer 94 are reconnected, respectively, to clutch/brake units 26R and 26L and the motor M slowly starts up again to its preset speed in the same direction causing the film to wind off of lefthand reel 12 and into righthand reel 14. As the mode switch 108 passes through its OFF position, it momentarily breaks and makes the control voltage to time delay relay 106 thus reinitiating the time delay period.

In going directly from FORWARD to REVERSE, the system functions essentially the same as just described in going from REVERSE to FORWARD except that instead of time delay relay 119 timing out while timed delay relay 106 is timing in, both time delay relays 118 and 106 time in together allowing the system to come slowly to a stop before starting up again in the opposite direction.

A/B-wind switch 95 is a single-pole double-throw switch, which alternately changes the states of both latching relays 99 and 101 simultaneously and by doing so, selects either clutch/brake unit 26L or clutch/brake 26M to receive either a fixed brake voltage or a variable clutch voltage as determined by the condition of clutch/brake selector relays 97 and 112.

Control voltage to latching relays 99 and 101 is interrupted through a second set of normally-closed contacts in time delay relay 106, any time that relay 106 has switched in and caused motor M to operate. This is a safety guard to prevent switching between clutch/brake unit 26L and clutch/brake unit 26M while the rewinder is in operation, which would cause great stress on the drive mechanics of the system.

Another section of latching relay 101, selects which indicator bulb located in illuminated A/B-wind switch 95 will receive 24VAC.

What is claimed is:

1. In an apparatus for winding film which includes first and second film reel mounting spindles mounted for rotation in spaced substantially parallel relation; first and second film reels selectively mountable upon one of said first and second spindles for rotation therewith in side-by-side spaced relation, said reels being aligned to transfer a length of film wound upon one to the other; an electric motor; first and second input shafts journalled for rotation in coaxial relation to said first and second spindles; a first electrically-actuated electromagnetic combination clutch/brake unit operatively interconnecting said first input shaft to said first spindle; a second electrically-actuated electromagnetic combination clutch/brake unit operatively interconnecting said second input shaft to said second spindle; a first power transfer means operatively interconnecting said motor and said first and second input shafts for simultaneous synchronous rotation; said first clutch/brake unit having a first actuated position effective to frictionally link said first input shaft and first spindle together for conjoint rotation, said second clutch/brake unit having a deactuated position disconnecting said second input shaft from said second spindle and a first actuated position effective to frictionally inhibit relative rotational movement between said second input shaft and said second spindle in opposite directions; and control means electrically connected to said first and second clutch/brake units operative in a first position to actuate both of said first and second clutch/brake units into their first actuated positions whereby the film reel mounted on said first spindle becomes a driven take-up reel onto which the film is wound and the film reel mounted on said second spindle becomes a frictionally-braked supply reel effective to tension any film wound thereon as it passes to said take-up reel, the improvement which comprises: a third input shaft operatively connected to the first power transfer means for rotation in the opposite direction to said second input shaft; a fourth shaft journalled for rotation in coaxial relation to said third input shaft; a third clutch/brake unit having a deactuated position disconnecting said third and fourth shafts and a first actuated position effective to frictionally inhibit relative rotational movement between said coaxially aligned third and fourth shafts; and second power transfer means operatively interconnecting said fourth shaft and second spindle together for rotation in the same direction; said control means being electrically connected to said third clutch/brake unit and operative in a second actuated position to deactuate said second clutch/brake unit and actuate said third clutch/brake unit into its first actuated position so as to frictionally inhibit rotation of the supply reel on said second spindle in the same direction in which the take-up reel is turning.

2. The improvement as set forth in claim 1 in which: the control means includes a third actuated position operative to deactuate the third clutch/brake unit and actuate the second clutch brake unit into its first actuated position while leaving the first clutch brake unit in its first actuated position so as to frictionally inhibit rotation of the supply reel on the second spindle in the direction opposite to that in which the take-up reel is turning.

3. The improvement as set forth in claim 1 in which: the second and third input shafts are journalled for rotation in parallel relation to one another, the fourth shaft is journalled for rotation in parallel relation alongside the second spindle and the second power transfer means comprises a belt and pulley drive.

4. The improvement as set forth in claim 1 in which: the first clutch/brake unit has a second actuated position effective to frictionally inhibit relative rotational movement between said first input shaft and said first spindle in opposite directions; the second clutch/brake unit has a second actuated position effective to frictionally link said second input shaft and said second spindle together for conjoint rotation; the control means has a third actuated position operative to deactuate said third clutch/brake unit and to shift both said first and second clutch/brake units into their second actuated positions whereby the reel on said first spindle becomes the supply reel and the reel on the second spindle becomes the take-up reel in a rewind mode in which said take-up reel is turning in the opposite direction to said supply reel.

5. The improvement as set forth in claim 4 in which: the control means has a fourth actuated position in which the first clutch/brake unit is actuated into its second actuated position, the second clutch/brake unit is deactuated and the third clutch/brake unit is actuated into its first position whereby the reel on the second spindle becomes the take-up reel in a rewind mode in which it is turning in the same direction as the supply reel on the first spindle.

* * * * *